(12) United States Patent
Sun et al.

(10) Patent No.: US 11,487,629 B2
(45) Date of Patent: Nov. 1, 2022

(54) METHOD, DEVICE AND COMPUTER PROGRAM PRODUCT FOR MANAGING DATA BACKUP

(71) Applicant: EMC IP Holding Company LLC, Hopkinton, MA (US)

(72) Inventors: Adona Li Sun, Chengdu (CN); Qingxiao Zheng, Chengdu (CN); Sager Liao, Chengdu (CN); Jing Wang, Chengdu (CN); Beryl Xueqing Wang, Chengdu (CN); Bing Bai, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 105 days.

(21) Appl. No.: 16/838,667

(22) Filed: Apr. 2, 2020

(65) Prior Publication Data
US 2021/0157683 A1   May 27, 2021

(30) Foreign Application Priority Data
Nov. 22, 2019  (CN) .......................... 201911158177.3

(51) Int. Cl.
*G06F 11/14* (2006.01)
(52) U.S. Cl.
CPC ...... *G06F 11/1469* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 10,771,330 B1* | 9/2020 | Rangole | G06F 11/3006 |
| 10,824,536 B1* | 11/2020 | Vyas | G06K 9/6267 |
| 2019/0361626 A1* | 11/2019 | East | G06F 3/0653 |
| 2021/0240575 A1* | 8/2021 | Mulheren | G06F 11/1464 |
| 2022/0043712 A1* | 2/2022 | Rana | G06F 11/1451 |

* cited by examiner

*Primary Examiner* — Eddy Cheung
(74) *Attorney, Agent, or Firm* — Womble Bond Dickinson (US) LLP (57) ABSTRACT

A method, a device and a computer program product for managing data backup are provided. The method comprises: obtaining a first set of performance parameters of a backup client prior to performing a data backup, the backup client being configured to transmit data to a backup server for backup and record information about the data in a cache to avoid duplicate data being transmitted to the backup server; determining, from a plurality of sets of historical performance parameters collected during multiple historical data backups performed by the backup client, at least one set of historical performance parameters similar to the first set of performance parameters; determining, from the at least one set of historical performance parameters, a set of historical performance parameters indicating the best performance; and adjusting, based on the set of historical performance parameters, an available capacity of the cache to be used in the data backup.

21 Claims, 4 Drawing Sheets

METHOD, DEVICE AND COMPUTER PROGRAM PRODUCT FOR MANAGING DATA BACKUP

CROSS-REFERENCE TO RELATED APPLICATION

This patent application claims priority, under 35 U.S.C. § 119, of Chinese Patent Application No. 201911158177.3, filed Nov. 22, 2019, which is incorporated by reference herein in its entirety.

FIELD

Embodiments of the present disclosure generally relate to the field of data storage, and more specifically, to a method, a device and a computer program product for managing a data backup.

BACKGROUND

A data backup system generally includes a backup client and a backup server, where the backup client is configured to transmit data to be backed up to the backup server for backup. In a data backup system that supports the de-duplication function, a cache may be set in the memory of the backup client to record information about the data that has been transmitted to the backup server, so as to avoid duplicate data being transmitted to the backup server. In this way, the backup client only transmits new data to be backed up to the backup server for backup, thereby saving network traffic. The cache is usually managed by the backup client and the available capacity thereof (that is, the maximum memory size the cache occupies) is usually set to a fixed ratio relative to the total memory size of the backup client. However, such a mechanism is often unable to adapt to environmental changes and even seriously affects the performance of the data backup system in some cases.

SUMMARY

Embodiments of the present disclosure provide a method, a device and a computer program product for managing data backup.

In a first aspect of the present disclosure, there is provided a method for providing information. The method comprises: obtaining a first set of performance parameters of a backup client prior to performing a data backup, the backup client being configured to transmit data to a backup server for backup and record information about the data in a cache to avoid duplicate data being transmitted to the backup server; determining, from a plurality of sets of historical performance parameters collected during multiple historical data backups performed by the backup client, at least one set of historical performance parameters similar to the first set of performance parameters; determining, from the at least one set of historical performance parameters, a set of historical performance parameters indicating the best performance; and adjusting, based on the set of historical performance parameters, an available capacity of the cache to be used in the data backup.

In a second aspect of the present disclosure, there is provided an electronic device. The device comprises: at least one processing unit; at least one memory coupled to the at least one processing unit and storing instructions for execution by the at least one processing unit, the instructions, when executed by the at least one processing unit, causing the device to perform actions comprising: obtaining a first set of performance parameters of a backup client prior to performing a data backup, the backup client being configured to transmit data to a backup server for backup and record information about the data in a cache to avoid duplicate data being transmitted to the backup server; determining, from a plurality of sets of historical performance parameters collected during multiple historical data backups performed by the backup client, at least one set of historical performance parameters similar to the first set of performance parameters; determining, from the at least one set of historical performance parameters, a set of historical performance parameters indicating the best performance; and adjusting, based on the set of historical performance parameters, an available capacity of the cache to be used in the data backup.

In a third aspect of the present disclosure, there is provided a computer program product being tangibly stored on a non-transitory computer-readable medium and comprising machine-executable instructions which, when executed by a device, cause the device to perform the steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

In the various figures, the same or corresponding reference numerals indicate the same or corresponding parts.

DETAILED DESCRIPTION OF EMBODIMENTS

Preferred embodiments of the present disclosure will be described in more detail below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As described above, a data backup system generally includes a backup client and a backup server, where the backup client is configured to transmit data to be backed up to the backup server for backup. In a data backup system that supports the de-duplication function, a cache may be set in the memory of the backup client to record information about the data that has been transmitted to the backup server, so as to avoid duplicate data being transmitted to the backup server. In this way, the backup client only transmits new data to be backed up to the backup server for backup, thereby saving network traffic.

A cache is usually managed by a backup client. In some conventional solutions, the actual memory size of the cache (also known as the "actual capacity" of the cache) can be automatically increased as needed. However, the maximum memory size of the cache (also known as the "available capacity" of the cache, that is, the maximum value of the actual capacity of the cache) is usually set to a fixed ratio relative to the total memory size of the backup client. Such a mechanism is often unable to adapt to the requirements of different environments. For example, when a large amount of memory is used at the backup client and the CPU usage ratio is high, the available capacity of the cache cannot be automatically reduced to improve the performance of the system. In another example, if there are a large number of free memory resources at the backup client and the actual capacity of the cache has reached its upper limit, these free memory resources cannot be utilized by the cache to further improve the performance of the system. Different types of backup clients often have different system resources, such as CPUs, storage, and operating systems. These are important factors that affect the memory consumption of the backup client, which are not taken into account when setting the available capacity of the cache in the conventional scheme. In addition, different types of data often have different repetition rates, and their respective cache capacities should be different. If the available capacity of the cache is set to a fixed ratio relative to the total memory size, the full utilization of the memory and/or cache cannot be implemented.

A solution for managing data backup according to the embodiments of the present disclosure is proposed to solve the above-mentioned problems and/or other potential problems. In this solution, the first set of performance parameters of the backup client is obtained prior to performing a data backup, and then at least one set of historical performance parameters similar to the first set of performance parameters is determined from a plurality of sets of historical performance parameters collected during multiple historical data backups performed by the backup client. In the solution, a set of historical performance parameters indicating the best performance is further determined from at least one set of historical performance parameters, and the available capacity of the cache to be used in data backup is adjusted based on the set of historical performance parameters. In this way, according to the embodiments of the present disclosure, the performance of a data backup system can be significantly improved.

Figure 1:
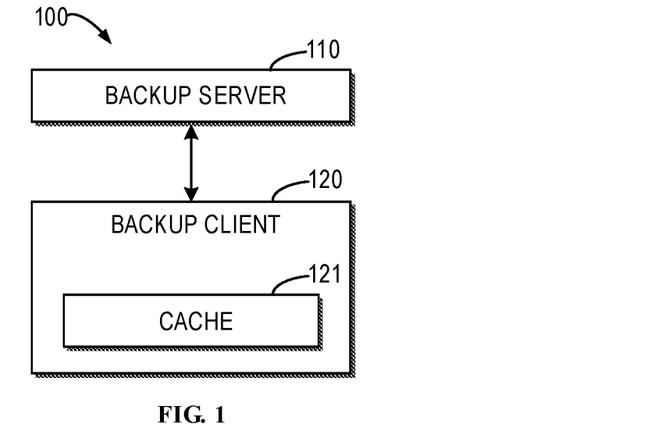
FIG. 1 illustrates a schematic diagram of an example backup system in which embodiments of the present disclosure herein can be implemented.

Hereinafter, embodiments of the present disclosure will be described in detail with reference to the accompanying drawings. FIG. 1 illustrates a schematic diagram of an example backup system 100 in which embodiments of the present disclosure herein can be implemented. It should be understood that the structure of the example backup system 100 is described only for the purpose of illustration, without implying any limitation on the scope of the present disclosure.

As shown in FIG. 1, the backup system 100 may include a backup server 110 and a backup client 120. For example, the backup server 110 and the backup client 120 may be implemented using any physical host, virtual machine, or other device, respectively. The backup server 110 and the backup client 120 may communicate with each other via a network (e.g., the Internet). The backup client 120 may be configured to transmit the data to be backed up to the backup server 110 for backup.

For example, the backup system 100 may support de-duplication. As shown in FIG. 1, the backup client 120 may be provided with a cache 121 (for example, in its memory) for recording information (for example, a hash value) related to data transmitted to the backup server 110. Before each data backup, by querying the cache 121, the backup client 120 may determine whether the data to be backed up is transmitted to the backup server 110. If the backup client 120 determines that the data to be backed up is transmitted to the backup server 110, the backup client 120 may no longer transmit the data to the backup server 110. If the backup client 120 determines that the data to be backed up is not transmitted to the backup server 110, the backup client 120 may transmit the data to the backup server 110 for backup. In this way, the backup client 120 can avoid transmitting duplicate data to the backup server 110, thereby saving network bandwidth.

In some embodiments, the actual capacity of the cache 121 may be dynamically adjusted. For example, as the data being backed up increases, the actual capacity of the cache 121 may increase accordingly until it reaches its upper limit (that is, the "available capacity"). At this time, if new data is backed up to the backup server 110, information (for example, a hash value) about the new data may replace the oldest information about the backed up data recorded in the cache 121.

In some embodiments, the available capacity of the cache 121 (that is, the maximum value of the actual capacity of the cache 121) may be dynamically adjusted to improve the performance of the backup system. In some embodiments, when the resource usage (e.g., the memory idleness rate or CPU idleness rate, etc.) at the backup client 120 changes and the magnitude of the change exceeds a predetermined threshold, the backup client 120 may dynamically adjust the available capacity of the cache 121.

In some embodiments, in order to achieve dynamic adjustment of the available capacity of the cache 121, the backup client 120 may record a corresponding performance parameter in each list during data backup. In some embodiments, when the resource usage (for example, the memory idleness rate or CPU idleness rate, etc.) at the backup client 120 changes and the magnitude of the change exceeds a predetermined threshold, the backup client 120 may adjust the available capacity of the cache 121 based on the history performance parameters recorded in the list.

In some embodiments, the backup client 120 may be configured to backup one or more data types (such as database data, virtual machine data and/or file system data, etc.). For each data type, the backup client 120 may record a corresponding performance parameter during each data backup for the data type in a list associated with the data type. In some embodiments, in response to a change in resource usage (for example, a memory idleness rate or a CPU idleness rate, etc.) at the backup client 120 and the magnitude of the change exceeds a predetermined threshold, prior to performing the data backup for the data type, the backup client 120 may adjust the available capacity of the cache 121 to be used in the data backup for the data type based on historical performance parameters recorded in the list associated with the data type.

Figure 2:
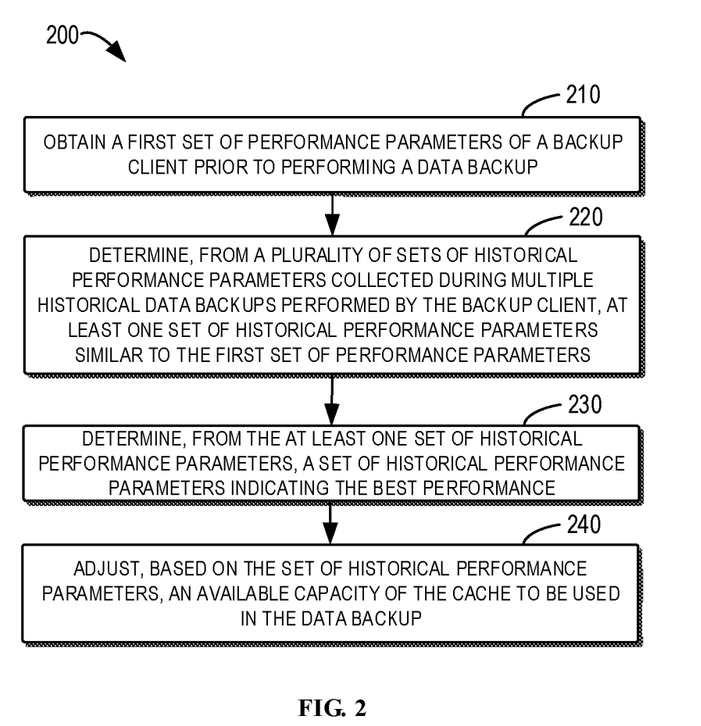
FIG. 2 illustrates a flowchart of an example method for managing data backup according to some embodiments of the present disclosure.

FIG. 2 illustrates a flowchart of an example method 200 for managing data backup according to some embodiments of the present disclosure. The method 200 may be performed at the backup client 120 as shown in FIG. 1. In some embodiments, the backup client 120 may perform the method 200 before performing each data backup. Alternatively or additionally, in some embodiments, the method 200 may be performed when the resource usage (e.g., a memory idleness rate or a CPU idleness rate) at the backup client 120 changes and the magnitude of the change exceeds a predetermined threshold. It should be understood that the method 200 may further include additional blocks not shown and/or the blocks shown may be omitted, and the scope of the present disclosure is not limited in this regard. The method 200 is described in detail below with reference to FIG. 1.

As shown in FIG. 2, at block 210, the backup client 120 obtains the first set of performance parameters of the backup client 120 before performing a data backup. In some embodiments, the first set of performance parameters may include at least the memory usage (e.g., a memory occupancy rate and/or memory idleness rate, etc.) at the backup client 120, and the CPU usage (e.g., a CPU occupancy rate and/or CPU idleness rate, etc.), the available capacity of the cache 121 currently set, and the data access performance (e.g., a data access speed, etc.) at the backup client 120. The backup client 120 may obtain the performance parameters of the backup client 120 by using any known or future developed means (for example, respective application programming interfaces or other means provided via the system).

At block 220, the backup client 120 determines, from a plurality of sets of historical performance parameters collected during multiple historical data backups, at least one set of historical performance parameters similar to the first set of performance parameters.

In some embodiments, prior to determining the at least one set of historical performance parameters is similar to the first set of performance parameters, the backup client 120 may obtain the plurality of sets of historical performance parameters based on the data type to which the data backup is to be performed.

Figure 3:
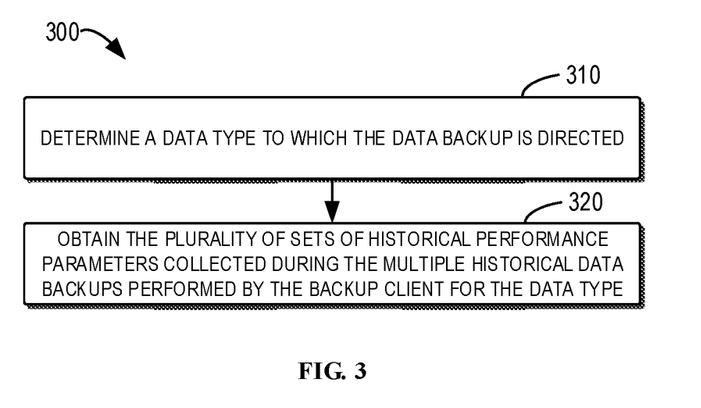
FIG. 3 illustrates a flowchart of an example method for determining a plurality of sets of historical performance parameters according to some embodiments of the present disclosure.

FIG. 3 illustrates a flowchart of an example method 300 for obtaining a plurality of sets of historical performance parameters. The method 300 may be performed at the backup client 120 as shown in FIG. 1.

As shown in FIG. 3, at block 310, the backup client 120 determines a data type to which the data backup is directed. Examples of the data types include, but are not limited to, database data, virtual machine data, and file system data, and so on. In some embodiments, each data backup may be directed to only one of the following data types: database data, virtual machine data, file system data, and the like.

At block 320, the backup client 120 obtains the plurality of sets of historical performance parameters collected during the multiple historical data backups performed by the backup client 120 for the data type. In some embodiments, as described above, the backup client 120 may record respective performance parameters during the data backup for each data type in a list associated with the data type. The backup client 120 may obtain the plurality of sets of historical performance parameters from respective lists.

In some embodiments, each of the plurality of sets of historical performance parameters may include at least: the average memory usage of the backup client 120 during a corresponding historical data backup (for example, the average memory occupancy rate and/or the average memory idleness rate, etc.), average CPU usage (e.g., average CPU usage and/or an average CPU idleness rate, etc.) of the backup client 120 during the corresponding historical data backup, an available capacity of the cache 121 used in the corresponding historical data backup; and the average data access performance (e.g., average data access speed, etc.) of the backup client 120 during the corresponding historical data backup.

Figure 4:
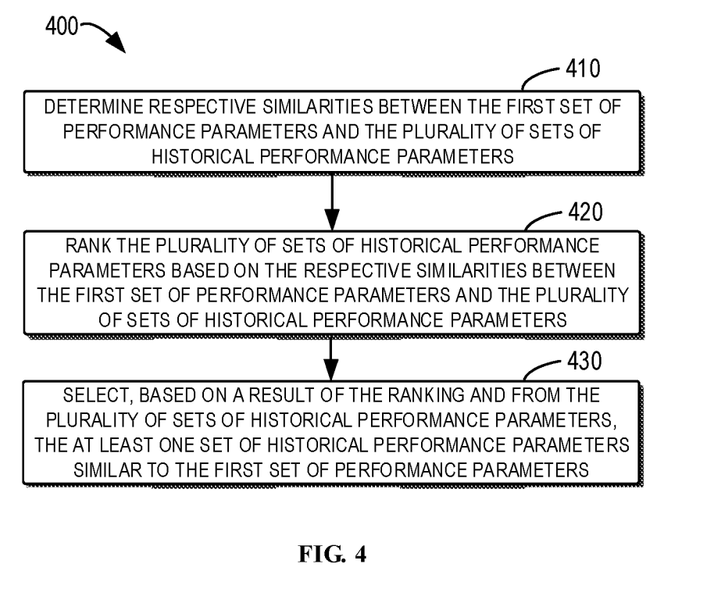
FIG. 4 illustrates a flowchart of an example method for determining at least one set of historical performance parameters similar to the current performance parameters from a plurality of sets of historical performance parameters according to some embodiments of the present disclosure.

FIG. 4 illustrates a flowchart of an example method 400 for obtaining a plurality of sets of historical performance parameters according to some embodiments of the present disclosure. The method 400 may be performed at the backup client 120 as shown in FIG. 1.

As shown in FIG. 4, at block 410, the backup client 120 determines the respective similarities between the first set of performance parameters and the plurality of sets of historical performance parameters. In some embodiments, for a given set of historical performance parameters in the plurality of sets of historical performance parameters, the backup client 120 may determine a similarity between the first set of performance parameters and the given set of historical performance parameters based on at least the average memory usage and average CPU usage in the given set of historical performance parameters, and the memory usage and CPU usage in the first set of performance parameters.

In some embodiments, the backup client 120 may determine the Euclidean distance between the first set of performance parameters and the given set of historical performance parameters based on at least the average memory usage and average CPU usage in the given set of historical performance parameters, and the memory usage and CPU usage in the first set of performance parameters:

$$D(x,y) = \sqrt{\Sigma_{w=1}^{2}(S_{wx}-S_{wy})^2} \qquad (1)$$

where, x represents the first set of performance parameters, y represents the given set of historical performance parameters, $S_{1x}$ represents the memory usage (for example, a memory idleness rate) in the first set of performance parameters, and $S_{2x}$ represents the CPU usage (for example, a CPU idleness rate) in the first set of performance parameters, $S_{1y}$ represents the average memory usage in the given set of historical performance parameters (for example, an average memory idleness rate), and $S_{2y}$ represents the average CPU usage in the given set of historical performance parameters (for example, an average CPU idleness rate). The smaller the Euclidean distance D (x, y), the higher the similarity between the first set of performance parameters and the given set of historical performance parameters.

Alternatively, in some embodiments, the backup client 120 may determine the Manhattan distance between the first set of performance parameters and the given set of historical performance parameters based on at least the average memory usage and average CPU usage in the given set of historical performance parameters, and the memory usage and CPU usage in the first set of performance parameters:

$$D(x, y) = \sum_{w=1}^{2} |S_{wx} - S_{wy}| \quad (2)$$

where, x represents the first set of performance parameters, y represents the given set of historical performance parameters, $S_{1x}$ represents the memory usage (for example, a memory idleness rate) in the first set of performance parameters, and $S_{2x}$ represents the CPU usage (for example, CPU idleness rate) in the first set of performance parameters, $S_{1y}$ represents the average memory usage in the given set of historical performance parameters (for example, an average memory idleness rate), and $S_{2y}$ represents the average CPU usage in the given set of historical performance parameters (for example, an average CPU idleness rate). The smaller the Manhattan distance D (x, y), the higher the similarity between the first set of performance parameters and the given set of historical performance parameters.

At block 420, the backup client 120 ranks the plurality of sets of historical performance parameters based on the respective similarities between the first set of performance parameters and the plurality of sets of historical performance parameters. Then, at block 430, the backup client 120 selects, based on the result of the ranking and from the plurality of sets of historical performance parameters, at least one set of historical performance parameters similar to the first set of performance parameters. In some embodiments, the backup client 120 may select, based on the result of the ranking and from the plurality of sets of historical performance parameters, a predetermined number (e.g., 10) of sets of historical performance parameters.

Returning to FIG. 2, at block 230, the backup client 120 determines, from the at least one set of historical performance parameters, a set of historical performance parameters indicating the best performance. In some embodiments, the backup client 120 may determine, from the at least one set of historical performance parameters, the set of historical performance parameters indicates the best average data access performance (e.g., the highest data access speed).

At block 240, based on the set of historical performance parameters, the backup client 120 adjusts the available capacity of the cache 121 to be used in the data backup. For example, this set of historical performance parameters may include the available capacity of the cache 121 set used in the corresponding historical data backup. In some embodiments, based on the available capacity of the cache 121 used in the corresponding historical data backup indicated in the set of historical performance parameters, the backup client 120 may adjust the available capacity of the cache 121 to be used in the data backup.

It should be understood that the system resource usage corresponding to the set of historical performance parameters is similar to the current resource usage of the system and the set of historical performance parameters indicates that the available capacity of the cache 121 set can achieve the best average data access performance. Therefore, better data access performance can be achieved by adjusting, based on the available capacity of the cache 121 indicated by the set of historical performance parameters, the available capacity of the cache 121 to be used in the data backup.

Additionally, the backup client 120 performs the current data backup based on the adjusted available capacity of the cache 121 and collects the second set of performance parameters of the backup client during the current data backup. Similarly, the second set of performance parameters may include at least: the average memory usage (for example, an average memory occupancy rate and/or an average memory idleness rate, etc.) of the backup client 120 during a data backup is performed, the average CPU usage (for example, an average CPU occupancy rate and/or average CPU idleness rate, etc.) of the backup client 120 during the data backup, the adjusted available capacity of the cache 121; and the average data access performance (for example, an average data access speed, etc.) of the backup client 120 during the data backup. The second set of performance parameters may be recorded in the corresponding list for later adjustment on capacity of the cache 121.

As can be seen from the above description, a solution for managing a cache at a backup client according to an embodiment of the present disclosure is proposed. In this solution, the first set of performance parameters of a backup client is obtained prior to performing a data backup, and then at least one set of historical performance parameters similar to the first performance parameters is determined from a plurality of sets of historical performance parameters collected during multiple historical data backups performed by the backup client. In the solution, a set of historical performance parameters indicating the best performance is further determined from at least one set of historical performance parameters and an available capacity of the cache to be used in data backup is adjusted based on the set of historical performance parameters. In this way, the backup client can intelligently adjust the maximum memory size that the cache can occupy so as to dynamically adapt to the changes in system resources. In addition, the backup client will make better use of the available system resources, thereby improving the performance of data backup.

Compared with conventional solutions, this solution has the following advantages: (1) in this solution, the impact of different system resources on memory occupation and the data repetition rate of different data types are taken into account, thus improving the performance of a data backup; (2) as time passes by and historical records increase, this solution will become more and more intelligent by continuous learning of the historical records; (3) the maximum memory size that can be occupied by the cache will be set to the most appropriate value, so system resources will be fully utilized, thereby improving the deduplication capability of the backup client; (4) the maximum memory size that the cache can occupy will be set to the most appropriate value and the deduplication capability of the backup client is improved, so the network traffic for a data backup is further saved; (5) customer will be more satisfied with the backup system benefiting from the above advantages.

Figure 5:
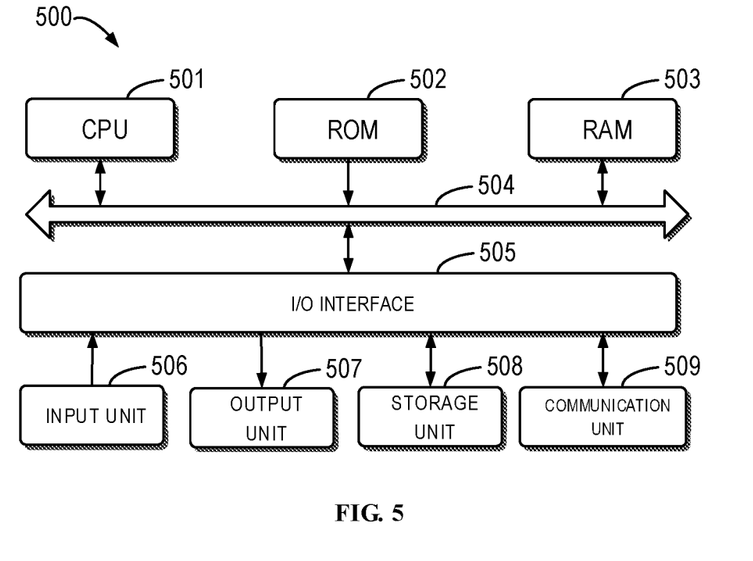
FIG. 5 illustrates a schematic block diagram of an example device for implementing embodiments of the present disclosure.

FIG. 5 illustrates a schematic block diagram of an example device 500 for implementing embodiments of the present disclosure. For example, the backup server 110 and/or the backup client 120 shown in FIG. 5 may be implemented by the device 500. As shown, the device 500 includes a central processing unit (CPU) 501, which may execute various suitable actions and processes based on the computer program instructions stored in a read-only memory (ROM) 502 or computer program instructions loaded in the random-access memory (RAM) 503 from a storage unit 508. The RAM 503 may also store all kinds of programs and data required by the operations of the device 500. The CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as a keyboard, a mouse and the like; an output unit 507, e.g., various kinds of displays and loudspeakers etc.; a storage unit 508, such as a magnetic disk and an optical disk etc.; and a communication unit 509, such as a network card, a modem, a wireless transceiver and the like. The communication unit 509 allows the device 500 to exchange information/data with other devices via the computer network, such as Internet, and/or various telecommunication networks.

The above described procedures and processes, such as the methods 200, 300 and or 400, may also be executed by the processing unit 501. For example, in some embodiments, the methods 200, 300 and or 400 may be implemented as a computer software program tangibly included in the machine-readable medium, e.g., the storage unit 508. In some embodiments, the computer program may be partially or fully loaded and/or mounted to the device 500 via the ROM 502 and/or communication unit 509. When the computer program is loaded to the RAM 503 and executed by the CPU 501, one or more steps of the above described methods 200, 300 and or 400 can be implemented.

The present disclosure may be a method, a device, a system and/or a computer program product. The computer program product may include a computer-readable storage medium, on which the computer-readable program instructions for executing various aspects of the present disclosure are loaded.

The computer-readable storage medium may be a tangible device that maintains and stores instructions utilized by the instruction executing devices. The computer-readable storage medium may be, but is not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions may be downloaded from the computer-readable storage medium to each computing/processing device, or to an external computer or external storage via Internet, local area network, wide area network and/or wireless network. The network may include a copper-transmitted cable, an optical fiber transmission, a wireless transmission, a router, a firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, where the programming languages consist of object-oriented programming languages, e.g., Smalltalk, C++ and so on, and conventional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer may be connected to the user computer via any type of network, including a local area network (LAN) and a wide area network (WAN), or to an external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Various aspects of the present disclosure are described here with reference to a flow chart and/or block diagram of method, device (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing devices to manufacture a machine, such that the instructions, when executed by the processing unit of the computer or other programmable data processing devices, generate a device for implementing functions/actions stipulated in one or more blocks in the flow chart and/or block diagram. The computer-readable program instructions may also be stored in the computer-readable storage medium and cause the computer, programmable data processing device and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing devices or other devices, so as to execute a series of operation steps on the computer, other programmable data processing devices or other devices to generate a computer-implemented procedure. Therefore, the instructions executed on the computer, other programmable data processing devices or other devices implement functions/actions stipulated in one or more blocks of the flow chart and/or block diagram.

The flow chart and block diagram in the drawings illustrate system architecture, functions and operations that may be implemented by system, method and computer program products according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks may be in fact executed in parallel or sometimes in a reverse order depending on the involved functions. It should also be noted that each block in the block diagram and/or flow chart and combinations of the blocks in the block diagram and/or flow chart may be implemented by a hardware-based system exclusively for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method of managing data backup, comprising:
    obtaining, via an application programming interface, a first set of performance parameters of a backup client prior to performing a data backup, the backup client being configured to transmit data to a backup server for backup and record information about the data in a cache to avoid duplicate data being transmitted to the backup server, wherein the first set of performance parameters includes at a first available capacity of the cache;
    determining, from a plurality of sets of historical performance parameters collected during multiple historical data backups performed by the backup client, at least one set of historical performance parameters similar to the first set of performance parameters;
    determining, from the at least one set of historical performance parameters, a set of historical performance parameters indicating the best performance, wherein the set of historical performance parameters includes at least a second available capacity of the cache; and
    adjusting, based on the set of historical performance parameters, the first available capacity of the cache to the second available capacity, wherein the cache is to be used in the data backup.

2. The method of claim 1, further comprising:
    prior to determining the at least one set of historical performance parameters,
        determining a data type to which the data backup is directed; and
        obtaining the plurality of sets of historical performance parameters collected during the multiple historical data backups performed by the backup client for the data type.

3. The method of claim 1, wherein one of the plurality of sets of historical performance parameters comprises:
    average memory usage of the backup client during a corresponding historical data backup,
    average CPU usage of the backup client during the corresponding historical data backup,
    an available capacity of the cache used in the corresponding historical data backup, and
    average data access performance of the backup client during the corresponding historical data backup.

4. The method of claim 3, wherein the first set of performance parameters comprises:
    memory usage at the backup client,
    CPU usage at the backup client,
    an available capacity of the cache prior to the data backup, and
    data access performance at the backup client.

5. The method of claim 4, wherein determining the at least one set of historical performance parameters comprises:
    determining respective similarities between the first set of performance parameters and the plurality of sets of historical performance parameters;
    ranking the plurality of sets of historical performance parameters based on the respective similarities between the first set of performance parameters and the plurality of sets of historical performance parameters; and
    selecting, based on a result of the ranking and from the plurality of sets of historical performance parameters, the at least one set of historical performance parameters similar to the first set of performance parameters.

6. The method of claim 5, wherein determining the respective similarities between the first set of performance parameters and the plurality of sets of historical performance parameters comprises:
    for a given set of historical performance parameters among the plurality of sets of historical performance parameters,
        determining a similarity between the first set of performance parameters and the given set of historical performance parameters based on at least the average memory usage and the average CPU usage in the given set of historical performance parameters and the memory usage and the CPU usage in the first set of performance parameters.

7. The method of claim 3, wherein determining the set of historical performance parameters indicating the best performance comprises:
    determining, from the at least one set of historical performance parameters, the set of historical performance parameters associated with a best average data access performance.

8. The method of claim 1, wherein the set of historical performance parameters comprises an available capacity of the cache used in a corresponding historical data backup, and adjusting the available capacity of the cache to be used in the data backup comprises:
    adjusting, based on the available capacity of the cache used in the corresponding historical data backup, the available capacity of the cache to be used in the data backup.

9. The method of claim 1, further comprising:
    performing the data backup based on the adjusted available capacity of the cache; and
    collecting a second set of performance parameters of the backup client during the data backup.

10. The method of claim 9, wherein the second set of performance parameters comprises:
    average memory usage of the backup client during the data backup,
    average CPU usage of the backup client during the data backup,
    the adjusted available capacity of the cache, and average data access performance of the backup client during the data backup.

11. An electronic device, comprising:
at least one processing unit;
at least one memory coupled to the at least one processing unit and storing instructions for execution by the at least one processing unit, the instructions, when executed by the at least one processing unit, causing the electronic device to perform acts comprising:
obtaining, via an application programming interface, a first set of performance parameters of a backup client prior to performing a data backup, the backup client being configured to transmit data to a backup server for backup and record information about the data in a cache to avoid duplicate data being transmitted to the backup server, wherein the first set of performance parameters includes at a first available capacity of the cache;
determining, from a plurality of sets of historical performance parameters collected during multiple historical data backups performed by the backup client, at least one set of historical performance parameters similar to the first set of performance parameters;
determining, from the at least one set of historical performance parameters, a set of historical performance parameters indicating the best performance, wherein the set of historical performance parameters includes at least a second available capacity of the cache; and
adjusting, based on the set of historical performance parameters, the first available capacity of the cache to the second available capacity, wherein the cache is to be used in the data backup.

12. The electronic device of claim 11, wherein the acts further comprise:
prior to determining the at least one set of historical performance parameters,
determining a data type to which the data backup is directed; and
obtaining the plurality of sets of historical performance parameters collected during the multiple historical data backups performed by the backup client for the data type.

13. The electronic device of claim 11, wherein one of the plurality of sets of historical performance parameters comprises:
average memory usage of the backup client during a corresponding historical data backup,
average CPU usage of the backup client during the corresponding historical data backup,
an available capacity of the cache used in the corresponding historical data backup, and
average data access performance of the backup client during the corresponding historical data backup.

14. The electronic device of claim 13, wherein the first set of performance parameters comprises:
memory usage at the backup client,
CPU usage at the backup client,
an available capacity of the cache prior to the data backup, and
data access performance at the backup client.

15. The electronic device of claim 14, wherein determining the at least one set of historical performance parameters comprises:
determining respective similarities between the first set of performance parameters and the plurality of sets of historical performance parameters;
ranking the plurality of sets of historical performance parameters based on the respective similarities between the first set of performance parameters and the plurality of sets of historical performance parameters; and
selecting, based on a result of the ranking and from the plurality of sets of historical performance parameters, the at least one set of historical performance parameters similar to the first set of performance parameters.

16. The electronic device of claim 15, wherein determining the respective similarities between the first set of performance parameters and the plurality of sets of historical performance parameters comprises:
for a given set of historical performance parameters among the plurality of sets of historical performance parameters,
determining a similarity between the first set of performance parameters and the given set of historical performance parameters based on at least the average memory usage and the average CPU usage in the given set of historical performance parameters and the memory usage and the CPU usage in the first set of performance parameters.

17. The electronic device of claim 13, wherein determining the set of historical performance parameters indicating the best performance comprises:
determining, from the at least one set of historical performance parameters, the set of historical performance parameters associated with a best average data access performance.

18. The electronic device of claim 11, wherein the set of historical performance parameters comprises an available capacity of the cache used in a corresponding historical data backup, and adjusting the available capacity of the cache to be used in the data backup comprises:
adjusting, based on the available capacity of the cache used in the corresponding historical data backup, the available capacity of the cache to be used in the data backup.

19. The electronic device of claim 11, wherein the acts further comprise:
performing the data backup based on the adjusted available capacity of the cache; and
collecting a second set of performance parameters of the backup client during the data backup.

20. The electronic device of claim 19, wherein the second set of performance parameters comprises:
average memory usage of the backup client during the data backup,
average CPU usage of the backup client during the data backup,
the adjusted available capacity of the cache, and
average data access performance of the backup client during the data backup.

21. A computer program product being tangibly stored on a non-transitory computer-readable medium and comprising machine-executable instructions which, when executed by a device, cause the device to perform operations, the operations comprising:
obtaining, via an application programming interface a first set of performance parameters of a backup client prior to performing a data backup, the backup client being configured to transmit data to a backup server for backup and record information about the data in a cache to avoid duplicate data being transmitted to the backup server, wherein the first set of performance parameters includes at a first available capacity of the cache;

determining, from a plurality of sets of historical performance parameters collected during multiple historical data backups performed by the backup client, at least one set of historical performance parameters similar to the first set of performance parameters;

determining, from the at least one set of historical performance parameters, a set of historical performance parameters indicating the best performance, wherein the set of historical performance parameters includes at least a second available capacity of the cache; and adjusting, based on the set of historical performance parameters, the first available capacity of the cache to the second available capacity, wherein the cache is be used in the data backup.

\* \* \* \* \*